United States Patent
Le Boudouil

(10) Patent No.: US 12,540,103 B2
(45) Date of Patent: Feb. 3, 2026

(54) METHOD FOR THE THREE-DIMENSIONAL DECORATION OF A SUBSTRATE TO PRODUCE AN EXTERNAL PART

(71) Applicant: Comadur SA, Le Locle (CH)

(72) Inventor: Damien Le Boudouil, Valdahon (FR)

(73) Assignee: Comadur SA, Le Locle (CH)

( * ) Notice: Subject to any disclaimer, the term of this patent is extended or adjusted under 35 U.S.C. 154(b) by 0 days.

(21) Appl. No.: 18/782,270

(22) Filed: Jul. 24, 2024

(65) Prior Publication Data

US 2025/0066262 A1 Feb. 27, 2025

(30) Foreign Application Priority Data

Aug. 23, 2023 (EP) ...................................... 23192986

(51) Int. Cl.
  *C04B 41/45* (2006.01)
  *C04B 41/00* (2006.01)
  *C04B 41/50* (2006.01)
  *C04B 41/51* (2006.01)

(52) U.S. Cl.
  CPC ...... *C04B 41/4507* (2013.01); *C04B 41/0072* (2013.01); *C04B 41/5022* (2013.01); *C04B 41/51* (2013.01)

(58) Field of Classification Search
  CPC ............ C04B 41/0071; C04B 41/4507; C04B 41/5022; C04B 41/51
  See application file for complete search history.

(56) References Cited

U.S. PATENT DOCUMENTS

| 5,738,799 A | * | 4/1998 | Hawkins | ................ | B41J 2/1632 |
| | | | | | 216/2 |
| 2019/0278182 A1 | * | 9/2019 | Laforge | ................ | G04B 19/10 |
| 2019/0302697 A1 | * | 10/2019 | Larriere | ................ | C23C 14/14 |

FOREIGN PATENT DOCUMENTS

| CH | 709789 B1 | * | 5/2021 | ............. | G04B 19/12 |
| EP | 3 453 684 A1 | | 3/2019 | | |
| EP | 3 536 826 B1 | | 4/2021 | | |
| EP | 3 839 659 A1 | | 6/2021 | | |

OTHER PUBLICATIONS

European Search Report for EP 23 19 2986, dated Jan. 24, 2024.

* cited by examiner

*Primary Examiner* — Nathan H Empie
(74) *Attorney, Agent, or Firm* — Sughrue Mion, PLLC

(57) ABSTRACT

A method for the three-dimensional decoration of a substrate (11) to produce an external part (10), which method includes the steps of: depositing an enamel base layer (12) on an external surface (110) of a ceramic substrate (11); firing the substrate (11) covered with the base layer (12); etching the base layer (12) in a predefined decorative pattern to generate one or more blind cavities; depositing a decorative layer (13) of ceramic material and/or metallic material on the base layer (12) and the cavities (120) so as to fill said cavities (120) in order to form decorative elements (130); surfacing the decorative layer (13) to remove said layer deposited on the base layer (12); and tribofinishing the substrate (11), the base layer (12) and the decorative layer (13) to remove the base layer (12).

6 Claims, 1 Drawing Sheet

METHOD FOR THE THREE-DIMENSIONAL DECORATION OF A SUBSTRATE TO PRODUCE AN EXTERNAL PART

CROSS REFERENCE TO RELATED APPLICATIONS

This application claims priority to European Patent Application No. 23192986.0 filed Aug. 23, 2023, the entire contents of which are incorporated herein by reference.

TECHNICAL FIELD OF THE INVENTION

The invention relates to the decoration of timepieces, jewellery or fashion items, and in particular to the manufacture of external parts.

More particularly, the invention relates to a method for the three-dimensional decoration of a substrate in order to produce an external part. This method can be advantageously applied to any external part in the field of watchmaking, jewellery, or fashion items such as leather goods, eyewear, writing instruments or portable electronic devices.

TECHNOLOGICAL BACKGROUND

There are numerous methods for producing raised decorations on a surface of a substrate in order to form an external part, such as a dial, a plate, a bridge, a gear train, an oscillating weight, a bezel, a middle, links of a bracelet or a clasp of a bracelet, in the field of watchmaking.

Among these methods, there are those that generate a mask on a substrate, the mask comprising openings whose contours correspond to the shape of elements of the desired decoration. These openings are filled with a material constituting the decorative elements, and the mask is then removed.

Although simple, this method has a number of drawbacks. More specifically, in some cases, the mask may not be in close contact with the surface of the substrate, which can lead to problems in meeting manufacturing tolerances for the decoration.

Another drawback is that this method requires the deposition of the decorative elements to not damage the mask, in which case the manufacturing tolerances would not be respected, and requires the mask to be removed without damaging the substrate and the decorations. This method thus offers very little freedom in terms of the materials that can be used to make the substrate and decorations.

SUMMARY OF THE INVENTION

The invention overcomes the aforementioned drawbacks by offering a solution that ensures that the manufacturing tolerances of the decorations are respected and that the mask is held in place when the decorative elements are being deposited, and that guarantees that the integrity of the substrate and of the decorations is respected when the mask is being removed.

To this end, the invention relates to a method for the three-dimensional decoration of a substrate to produce an external part, which method comprises the steps of:
depositing at least one enamel base layer on an external surface of a ceramic substrate;
firing the substrate covered with the base layer;
etching the base layer in a predefined decorative pattern so as to generate one or more blind cavities extending between a bottom formed by the substrate and an opening formed by the base layer;
depositing a decorative layer of ceramic material and/or metallic material on the base layer and the cavities so as to fill said cavities in order to form decorative elements;
surfacing the decorative layer so as to remove all of said layer deposited on the base layer;
tribofinishing the substrate and the base and decorative layers to remove the entire base layer.

In particular implementations, the invention can further include one or more of the following features, taken alone or according to any combination technically possible.

In particular implementations, the base layer is surfaced after the firing step.

In particular implementations, the decorative layer is deposited such that its thickness in the cavities is greater than or equal to the thickness of the decorative elements at the end of the method.

In particular implementations, the base layer is made of borosilicate enamel.

In particular implementations, the base layer is made of sodium borosilicate enamel.

In particular implementations, during the firing step, the temperature to which the substrate covered with the base layer is subjected is between 500° C. and 1500° C., preferably substantially equal to 1000° C.

BRIEF DESCRIPTION OF THE FIGURES

Other features and advantages of the invention will become apparent from the following detailed description, which is given by way of example and is by no means limiting, with reference to the accompanying drawings in which.

It should be noted that the figures are not necessarily drawn to scale for clarity purposes.

DETAILED DESCRIPTION OF THE INVENTION

The present invention relates to a method for the three-dimensional decoration of a substrate 11 in order to produce an external part 10, as shown successively in FIGS. 1a to 1f.

Figure 1A:
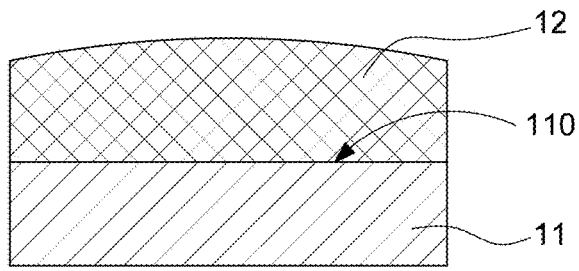
FIGS. 1a to 1f diagrammatically show a sectional view of the steps involved in carrying out a method for decorating a substrate in order to produce an external part according to a preferred example embodiment of the invention.
Figure 1B:
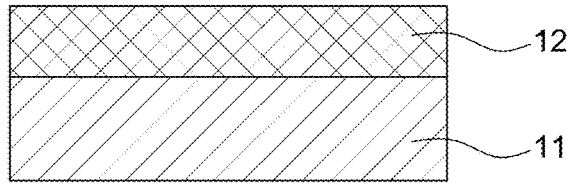

The method firstly comprises a step of depositing at least one enamel base layer 12 on an external surface 110 of a ceramic substrate 11, as shown in FIG. 1a. The external surface 110 is intended to be visible to a user once the external part 10 has been produced. Preferably, the base layer 12 is deposited over the entire external surface 110.

In the preferred example implementation of the invention, the base layer 12 is made of borosilicate enamel, in particular sodium borosilicate enamel, for reasons which are described in detail below. The base layer 12 can be applied by dip coating, spraying or brushing. In this text, for reasons of language and to simplify reading, the singular is used when referring to the base layer 12, although the base layer 12 can be composed of a stack of layers.

Advantageously, the substrate 11 can be made of any dense ceramic, such as zirconia, alumina, Yttrium Aluminium Garnet (also known by the acronym "YAG"), sapphire or a mixture of these elements.

The base layer 12 and the substrate 11 are then fired in an oven at a temperature of between 500 and 1500 degrees Celsius, preferably 1000 degrees, so as to cause the base layer 12 to melt and adhere chemically to the substrate 11. Thanks to its composition, the adhesion of the base layer 12 to the substrate 11 is guaranteed following this step.

The base layer 12 is preferably surfaced following the firing step, so as to flatten its visible surface and even out its thickness. More specifically, as FIG. 1a shows in an exaggerated fashion, the base layer 12 is likely to vary in thickness. In particular, the surface of the base layer 12 can have a succession of hollows and bulges due to a surface tension phenomenon occurring during the firing of the base layer 12, and the thickness of the base layer 12 can be greater at the centre of the external surface 110 than at its periphery due to the wettability of said layer. Furthermore, if the external surface 110 does not extend horizontally, i.e. forms a slope, the base layer 12 can have a tendency to flow in the direction of the slope during firing, and thus to generate an excess thickness, under the effect of gravity and due to its hot viscosity.

The base layer 12 is preferably surfaced by mechanical abrasion, for example by grinding or sanding. The result of this step is shown diagrammatically in FIG. 1b.

Figure 1C:
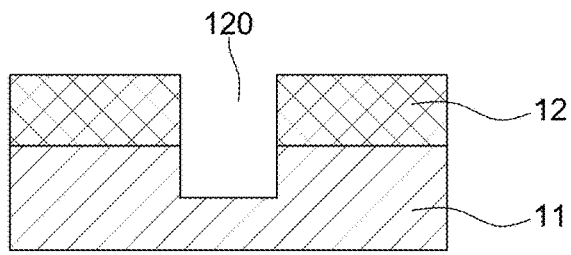

The base layer 12 is then etched according to a predefined decorative pattern. More specifically, the purpose of this etching step is to generate one or more blind cavities 120 in the base layer 12 in order to house raised decorative elements 130, as discussed in more detail below. The cavities 120 extend between a bottom formed by the substrate 11 and an opening formed by the base layer 12 as shown in FIG. 1c. The surfacing step, following which the visible surface of the base layer 12 is planned, makes it possible to control the manufacturing tolerances of the cavities 120.

Advantageously, the cavities 120 can also extend into the substrate 11, as shown in FIGS. 1c to 1f. This feature further increases the adhesion of the decorative elements 130 within the substrate 11.

Preferably, the etching step is carried out by a laser, but can be carried out by any appropriate technical solution, for example by mechanical machining.

Figure 1D:
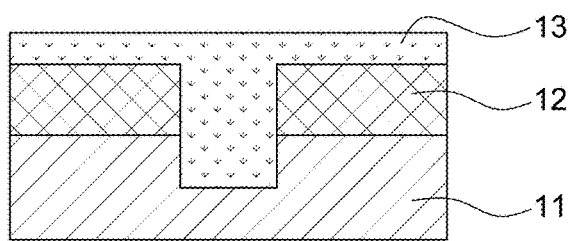

A decorative layer 13 is then deposited on the base layer 12 and in the cavities 120, as shown in FIG. 1d. Such a decorative layer 13 can be deposited by spraying, pressing, thermal and plasma spraying, or by slip deposition, depending on the material envisaged for the decorative layer 13. In particular, the decorative layer 13 can be made of a ceramic material, for example an enamel, such as a borosilicate enamel or a feldspar, and/or can be made of a metallic material. In this text, the term "metallic material" refers to any metal alloy, any pure metal or any metal composite.

The material constituting the decorative layer 13 advantageously has a melting point below the glass transition temperature of the material constituting the base layer 12 so that the base layer 12 is not damaged when the decorative layer 13 is being deposited. By way of example, the melting point of the material making up the base layer 12 is less than 600 degrees Celsius.

The decorative layer 13 is deposited so that its thickness in the cavities 120 is greater than or equal to the desired thickness of the decorative elements 130 at the end of the method.

Figure 1E:
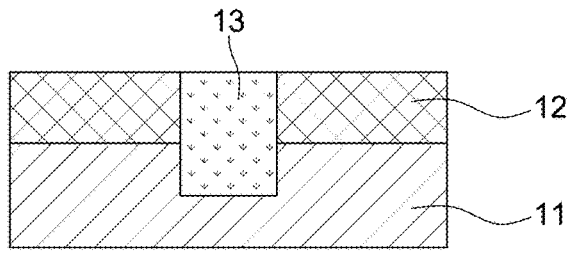

A surfacing step is carried out after the decorative layer 13 has been deposited so as to remove all of said decorative layer 13 deposited on the base layer 12, as shown in FIG. 1e. Such a surfacing operation is advantageously carried out by mechanical abrasion, for example by grinding or sanding.

Once the decorative layer 13 is present only in the cavities 120, a tribofinishing step is carried out to remove the entire base layer 12 and form the external part 10. Advantageously, thanks to the material of the base layer 12, this base layer is removed very easily and quickly by the tribofinishing step, without the abrasive elements causing uncontrolled damage to the external surface 110 of the substrate 11 or to the decorative elements 130 formed by the remnants of the decorative layer 13.

Figure 1F:
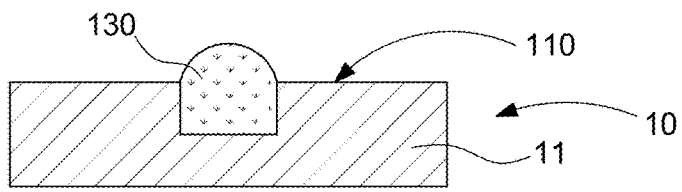

FIG. 1f diagrammatically illustrates this external part 10 and the potential effects of the tribofinishing step on the decorative element 130. In particular, the sharp edges of the decorative element 130 can be rounded by the abrasion caused during the tribofinishing step.

The material of the decorative layer 13 is chosen to withstand the tribofinishing step better than the base layer 12, which is sacrificial. More generally, it should be noted that the implementations and embodiments considered above have been described by way of non-limiting examples, and that other alternatives are consequently possible.

The invention claimed is:

1. A method for the three-dimensional decoration of a substrate (11) to produce an external part (10), which method comprises the steps of:
   depositing at least one enamel base layer (12) on an external surface (110) of a ceramic substrate (11);
   firing the substrate (11) covered with the base layer (12);
   etching the base layer (12) in a predefined decorative pattern so as to generate one or more blind cavities (120) extending between a bottom formed by the substrate (11) and an opening formed by the base layer (12);
   depositing a decorative layer (13) of ceramic material and/or metallic material on the base layer (12) and the cavities (120) so as to fill said cavities (120) in order to form decorative elements (130), the material of the decorative layer (13) being chosen such that its melting point is below the glass transition temperature of the material constituting the base layer (12);
   surfacing the decorative layer (13) so as to remove all of said layer deposited on the base layer (12); and
   tribofinishing the substrate (11), the base layer (12) and the decorative layer (13) to remove the entire base layer (12).

2. The method according to claim 1, wherein the base layer (12) is surfaced after the firing step.

3. The method according to claim 1, wherein the decorative layer (13) is deposited so that its thickness in the cavities (120) is greater than or equal to the thickness of the decorative elements (130) at the end of the method.

4. The method according to claim 1, wherein the base layer (12) is made of borosilicate enamel.

5. The method according to claim 4, wherein the base layer (12) is made of sodium borosilicate enamel.

6. The method according to claim 1, wherein during the firing step, the temperature to which the substrate (11) covered with the base layer (12) is subjected is between 500° C. and 1500° C.

* * * * *